United States Patent [19]
Wirth et al.

[11] Patent Number: 5,259,253
[45] Date of Patent: Nov. 9, 1993

[54] DYNAMOMETER WITH PARALLEL GUIDE

[75] Inventors: Johannes Wirth; Mario Gallo, both of Zurich, Switzerland

[73] Assignee: Wirth Gallo Messtechnick AG, Zurich, Switzerland

[21] Appl. No.: 353,650

[22] PCT Filed: Mar. 10, 1988

[86] PCT No.: PCT/CH88/00056
§ 371 Date: May 30, 1989
§ 102(e) Date: May 30, 1989

[87] PCT Pub. No.: WO89/01611
PCT Pub. Date: Feb. 23, 1989

[30] Foreign Application Priority Data

Aug. 8, 1987 [CH] Switzerland ............... 3040/87-4

[51] Int. Cl.⁵ ................................................ G01L 1/04
[52] U.S. Cl. ......................... 73/862.638; 73/862.637
[58] Field of Search ............ 73/862.62, 862.64, 862.65, 73/862, 629, 631, 632, 633, 637, 638

[56] References Cited

U.S. PATENT DOCUMENTS

| 2,576,417 | 11/1951 | Ruge | 73/862.65 |
| 2,597,751 | 5/1952 | Ruge | 73/772 |
| 2,997,875 | 8/1961 | Moore | 73/862.62 |
| 3,805,604 | 4/1974 | Ormond | 73/862.62 |
| 4,009,608 | 3/1977 | Ormond | 73/862.65 |
| 4,020,686 | 5/1977 | Brendel | 73/862.62 |
| 4,343,196 | 8/1982 | Wirth et al. | 73/862.62 |
| 4,655,306 | 4/1987 | Saner | 177/229 |
| 4,703,816 | 11/1987 | Saner | 177/229 |

FOREIGN PATENT DOCUMENTS

| 0094290 | 11/1983 | European Pat. Off. . |
| 0195875 | 10/1986 | European Pat. Off. . |
| 8633812.6 | 3/1987 | Fed. Rep. of Germany . |
| 2111228A | 6/1983 | United Kingdom . |

Primary Examiner—Richard E. Chilcot, Jr.
Assistant Examiner—Elizabeth L. Dougherty
Attorney, Agent, or Firm—Johnson & Gibbs

[57] ABSTRACT

The parallel guide of an elastic force reducing dynamometer comprises a frame secured to a base plate, two essentially parallel plates, a load carrier, and four elastic tie joints. The load carrier supports a balance pan for receiving weights. A load-carrying element is clamped between the upper end of the load carrier and the lower end of the frame. Compressive force exerted on the load carrier is converted into an electric signal. The parallel guide is manufactured from a single piece, for example by profile extrusion or wire erosion. In an alternate embodiment of the invention, the load-carrying element is clamped between the lower end of the load carrier and the upper end of the frame. Tensile force exerted on the load carrier is converted into an electric signal.

6 Claims, 4 Drawing Sheets

DYNAMOMETER WITH PARALLEL GUIDE

FIELD OF THE INVENTION

This invention relates to a dynamometer with an elastic force reducing parallel guide. More particularly, this invention relates to a dynamometer in which the load-carrying element is arranged between the load carrier of the dynamometer and the frame of the parallel guide, whereby the load-carrying element simultaneously serves to arrest the entire dynamometer.

BACKGROUND OF THE INVENTION

Such dynamometers are known, for example, from European Patent 85810126.4. There, the load-carrying element is installed perpendicular to the rods forming the parallel guide and parallel to the force being measured. The measuring system, formed from the parallel guide, the load-carrying element, and an additional rod system, is attached on one side to the frame and on the other side to the load carrier. In such a manner, the frame and load carrier are shielded from load-stipulated deformations by the measuring system. This is also referred to as "drainage". This type of construction is complicated, expensive and results in a structure of considerable height. This is particularly true since jibs must be provided on the side of the frame and on the side of the load carrier to transfer force to the load-carrying element.

The goal of the present invention is to overcome such disadvantages and to provide a measuring system of reduced height which is both simple and less costly to manufacture. It is another goal of this invention to provide a dynamometer for use in weight determination which is insensitive to where the load is applied, thereby eliminating the need for a drainage aid.

SUMMARY OF THE INVENTION

A dynamometer having a parallel guide includes a load carrier for receiving a force and a load-carrying element for measuring the force on the load carrier. The load-carrying element is mounted between the load carrier and the parallel guide. Force transferring elements such as struts are mounted between the load carrier and the load carrier element and the load carrier element and the parallel guide, respectively, such that the horizontal and vertical components of the force measured by the load-carrying element has a ratio in the range of 1:10 to 10:1.

BRIEF DESCRIPTION OF THE DRAWINGS

The invention may be better understood, and its numerous features and advantages will become apparent to those skilled in the art by reference to the accompanying drawings in which:

FIG. 2b is a top view of FIG. 2a;

DETAILED DESCRIPTION OF THE INVENTION

Figure 1:
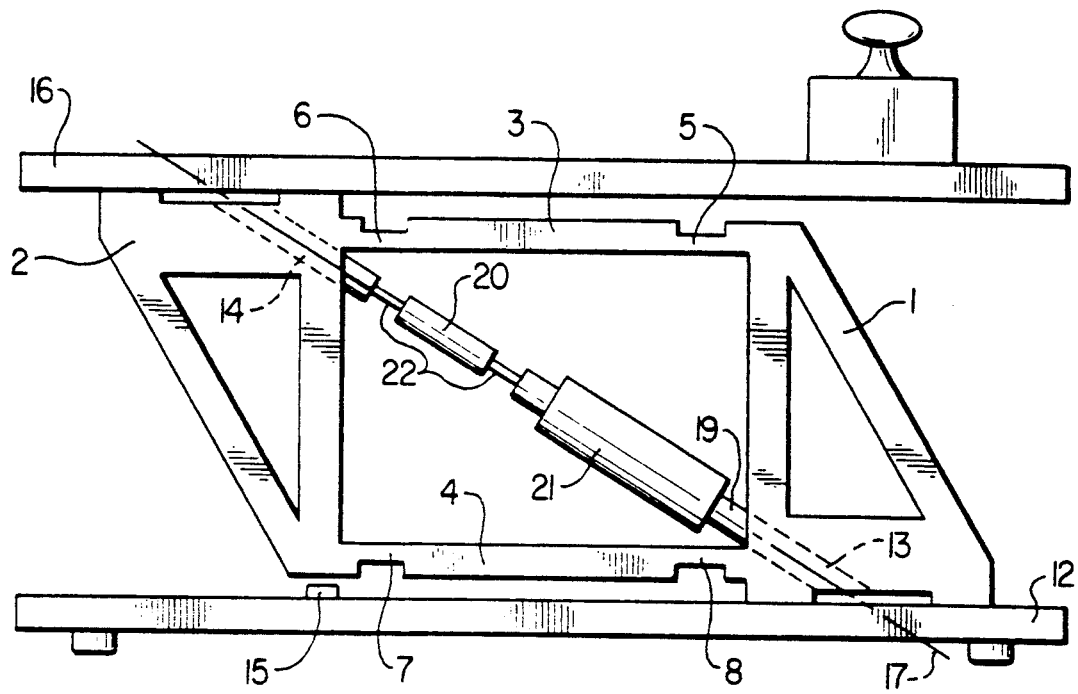
FIG. 1 is a side view of a first dynamometer constructed in accordance with the teachings of the present invention.

Turning first to FIG. 1, a first dynamometer constructed in accordance with the teachings of the present invention may now be seen. The dynamometer comprises frame 1, load carrier 2, two generally horizontal plates 3, 4 and four tie joints 5, 6, 7, and 8. Frame 1, which, for example, may include a generally triangular hollow section, is attached to base plate 12 with screws (not shown). On one side, tie joints 5, 8 connect plates 3, 4, respectively, with frame 1. Similarly, load carrier 2 is connected to plates 3, 4 by tie joints 6, 7, respectively. As herein defined, as "elastic parallel guide" results when plates 3, 4 are of approximately equal length and are generally parallel to each other and when tie joints 5 to 8 have a nearly identical design. Accordingly, FIG. 1 illustrates an elastic parallel guide attached at one end to Frame 1 and at the other end to load carrier 2. Here, the parallel guide includes a hollow profile corresponding to the hollow profile of frame 1. Balance pan 16, which may be used for receiving weight 16a, is also mounted on load carrier 2, for example, using screws (not shown).

Figure 2A:
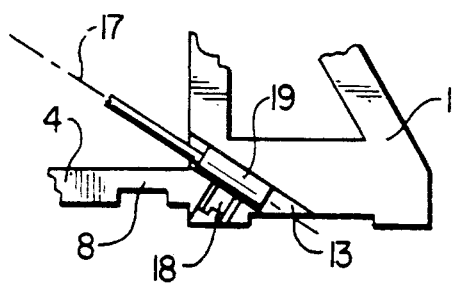
FIG. 2a is an enlarged view of the dynamometer illustrated in FIG. 1 which better illustrates strut 19.
Figure 2B:
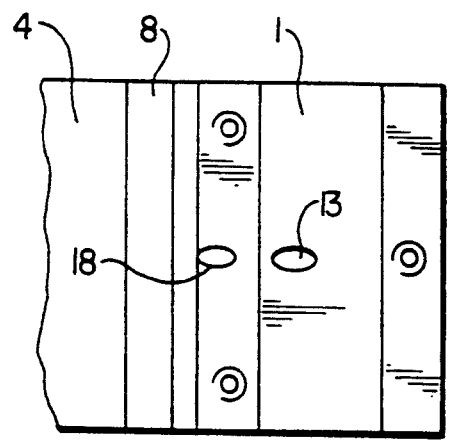

Turning next to FIG. 2a, the lower portion 1a, of frame 1 may now be better seen. The lower portion 1a is provided with cylindrical opening 13 for receiving strut 19. Similarly, the upper portion 2a of load carrier 2 is provided with cylindrical opening 14 for receiving strut 20 (see FIG. 1). Cylindrical openings 13, 14 are disposed coaxial to axis 17 running diagonally through the entire parallel guide. Struts 19, 20 are mounted in cylindrical openings 13, 14, respectively, by screws 18. A load carrying element 21 is positioned between load carrier 2 and frame 1 and along axis 17 by struts 19, 20. In such a manner, struts 19, 20 support load-proportional pressure forces on load-carrying element 21, thereby producing an analog or digital electric signal from the force in accordance with a method belonging to the state of the art. For example, load-carrying element 21 may include a wire strain gauge, a piezoelectric resonator, a capacitive transformer and lateral oscillating wires. See, for example, West German Registered Design G8633612.6.

When balance pan 16 is loaded with weight, for example by placing weight 16a on balance pan 16, the elastic parallel guide distributes the force thereby applied. The ordinarily larger part of the force produced by weight 16a is diverted directly to frame 1 through tie joints 5, 6, 7, 8 and plates 3, 4. The remaining part of the force flow through load-carrying element 21. This remaining force is enlarged due to the diagonal direction of its flow position. Furthermore, this force distribution results in additional tensile forces in plates 3, 4. However, measurement of the force is not impaired as a result of the low longitudinal elasticity of plates 3, 4 and tie joints 5, 6, 7, 8. The movement of load carrier 2—arrested by load-carrying element 21—is just a potentiality. Under overload conditions, however, load carrier 2 will contact stop 15 mounted on base plate 12.

The force acting on load-carrying element 21 in the longitudinal direction may be separated into a horizontal component and a vertical component. The mutual ratio of these components can be varied over a wide range between the values 1:10 to 10:1, depending on the ratios of the sizes of the parallel guide elements and the location and type of force introduction.

In another embodiment of our invention, a pair of struts, both attached on frame 1 parallel to each other and symmetrical to axis 17 may be used in place of strut 19. Since a pair of struts is used to replace strut 19 at the lower end of the load carrying element 21, a pair of struts may also be used to replace strut 20 at the upper end. In this configuration, the load-carrying element 21 is prevented from executing torsional oscillation around axis 17.

Figures 3A, 3B, 3C:
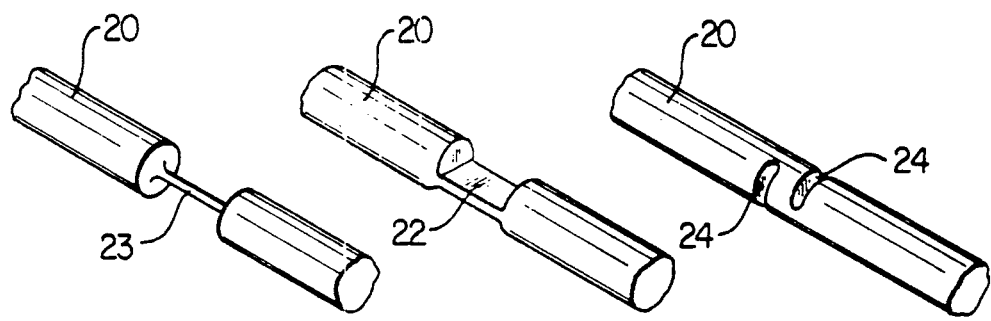
FIG. 3a illustrates a first embodiment of strut 20.
FIG. 3b illustrates a second embodiment of strut 20.
FIG. 3c illustrates a third embodiment of strut 20.

Turning next to FIGS. 3a–c, various configurations of struts 19, 20 may now be seen. The small—designated as potential—movement of load-carrier 2 under load conditions, leads to flexural stress of struts 19, 20. This flexural stress is absorbed by a pair of recesses 22. As may be seen by reference to FIG. 3b, recesses 22 may, for example, be provided on strut 20. Turning now to FIG. 3a, another strut configuration may be seen. Here, the size of strut 20 is drastically reduced for a short distance. For example, a portion of strut 20 approximately equal to the length of one to two diameters of the strut is reduced. In such a manner, a cylindrical predetermined flexural point 23 is produced. The reduced portion of strut 20 illustrated in FIG. 3a may be positioned at the same location of recesses 22 of FIG. 3b. Turning next to FIG. 3c, yet another configuration of strut 20 may be seen. Here, two offset notches 24 are provided on strut 20. Offset notches 24 extend out over the center of strut 20 and are positioned opposite each other with respect to the longitudinal axis of strut 20. In all of these embodiments, however, two predetermined flexural points can be present on the strut. Strut 20, provided either with recesses 22, predetermined flexural points 23, or notches 24, is capable of absorbing the small twists and/or bends which result during normal balance operation. A constant addition of tensile forces to plates 3, 4 and tie joints 5, 6, 7, 8 is exerted by diagonal installation of load-carrying element 21. The longitudinal elasticity of elements forming the connecting rod however plays a completely negligible role in the force measurement.

Figure 4:
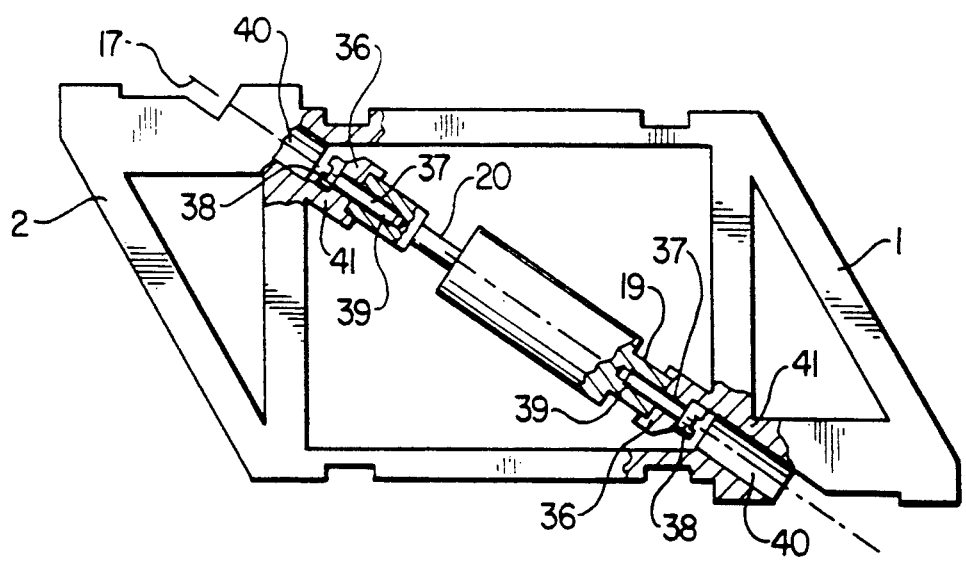
FIG. 4 is a side view of a second dynamometer constructed in accordance with the teachings of the present invention.

Turning next to FIG. 4, a second dynamometer constructed in accordance with the teachings of the present invention may now be seen. Here, struts 19, 20 are constructed to be substantially stronger than the struts described with reference to FIG. 1. Here, the predetermined flexural points are provided on the frame side. Connecting pieces 36 of essentially identical construction are provided on frame 1 and load carrier 2, respectively. Each connecting piece 36 is provided with an opening 37 coaxial to axis 17. In addition, struts 19, 20 are provided with threaded openings 19a, 20a and frame 1 and load carrier 2 are each provided with an opening 40. Screws 38 are inserted through openings 40 and into openings 37 to engage with threads 39 of struts 19, 20. Screws 38 are then secured by tightening. In this configuration, the predetermined flexural points would be reduced sections 41 of connecting pieces 36. Again, strut 19 and connecting piece 36 may be present in duplicate to prevent torsional oscillations around axis 17.

Figure 5:
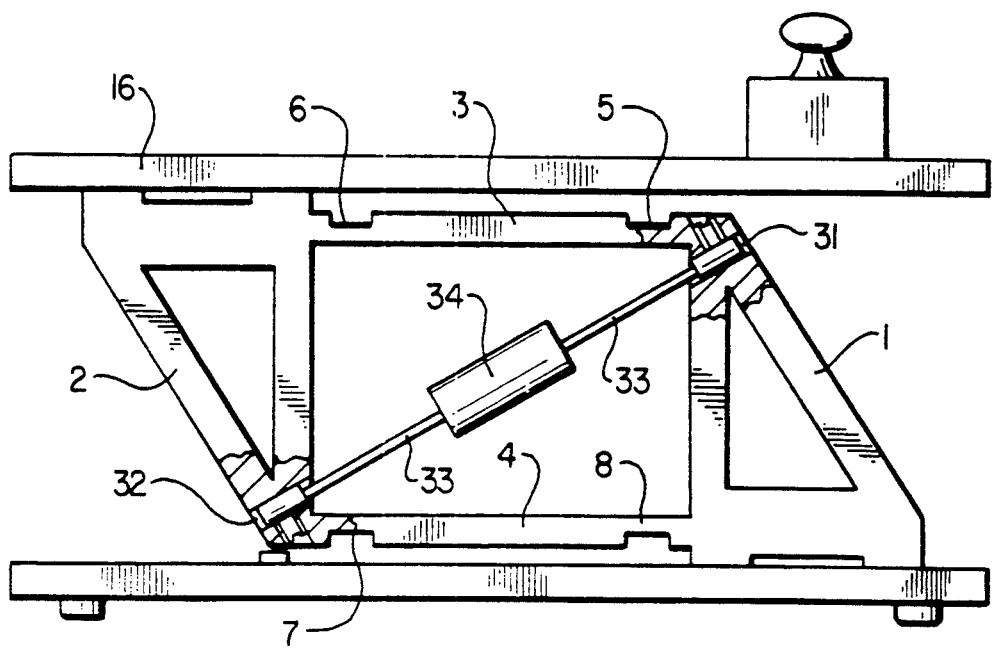
FIG. 5 is a side view of a third dynamometer constructed in accordance with the teachings of the present invention.

Turning next to FIG. 5, a third dynamometer constructed in accordance with the teachings of the present invention may now be seen. Similar to the dynamometer previously described with respect to FIG. 1, the dynamometer includes frame 1, load carrier 2, balance pan 16, plates 3, 4 and tie joints 5, 6, 7, 8. Frame 1 includes an opening 31 in the upper part 1b of frame 1 for receiving the end of a first force transferring element 33. Similarly, an opening 32 is provided on the lower part 2b of load carrier 2 for receiving the end of a second force transferring element 33. Openings 31, 32, which receive the force transferring elements 33, can be constructed either as struts or beam ties. Similar to the operation of load-carrying element 21 previously described with reference to FIG. 1, the tensile forces acting on load-carrying element 34 are transferred by force transferring elements 33 during measuring operations. The internal construction of the load receiving element makes it suitable, therefore, for measuring tensile forces. Similarly, the prior description of the bending of the struts 19, 20 is equally applicable for the force transferring element 33 described here.

Figure 6:
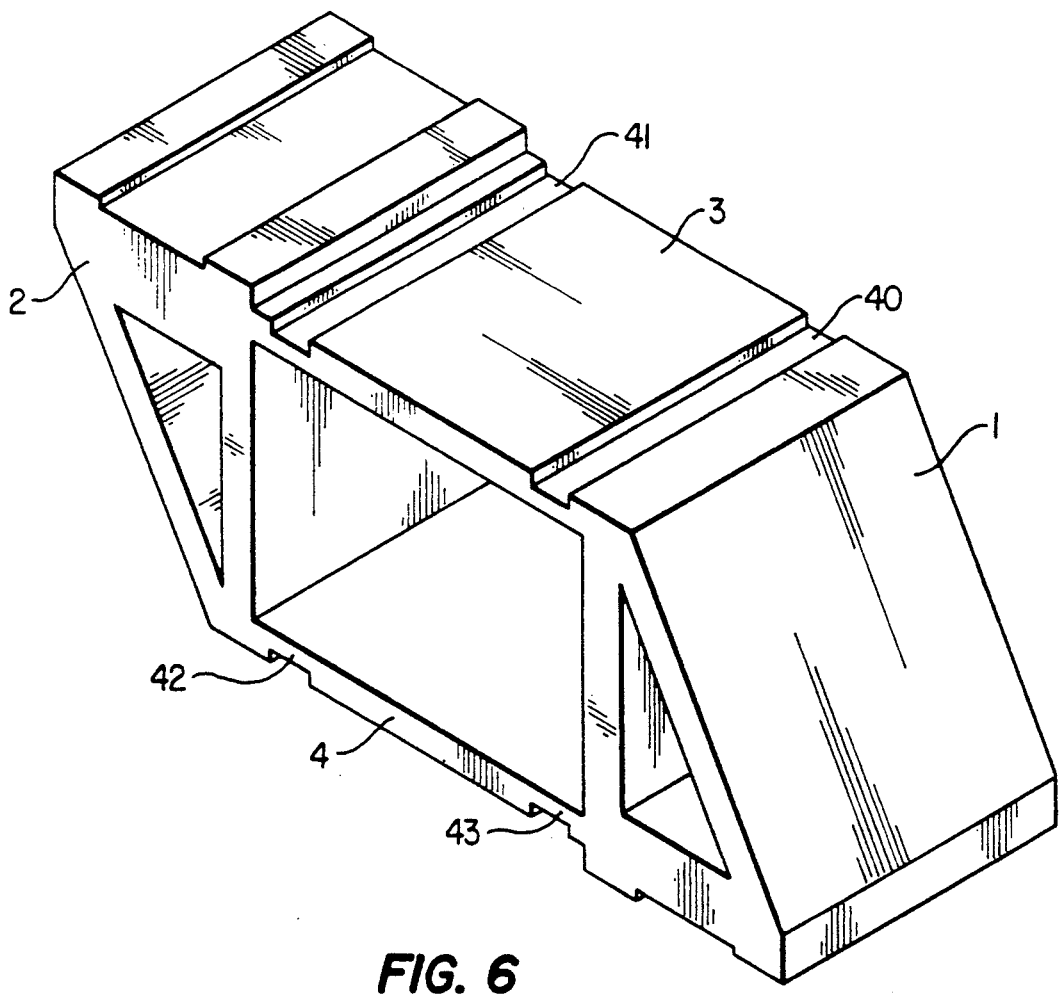
FIG. 6 is a perspective view of the parallel guide illustrated in FIG. 1.

Turning next to FIG. 6, a perspective view of the parallel guide illustrated in FIG. 1 may now be seen. Such a view is provided so that the manufacturing process of the parallel side illustrated in FIG. 1 may now be better described. As may now be seen, frame 1, load carrier 2, plates 3, 4 and four webs 40, 41, 42 and 43 are combined in an overall profile which may be manufactured from a blank, for example, by extrusion or wire erosion.

Figure 7:
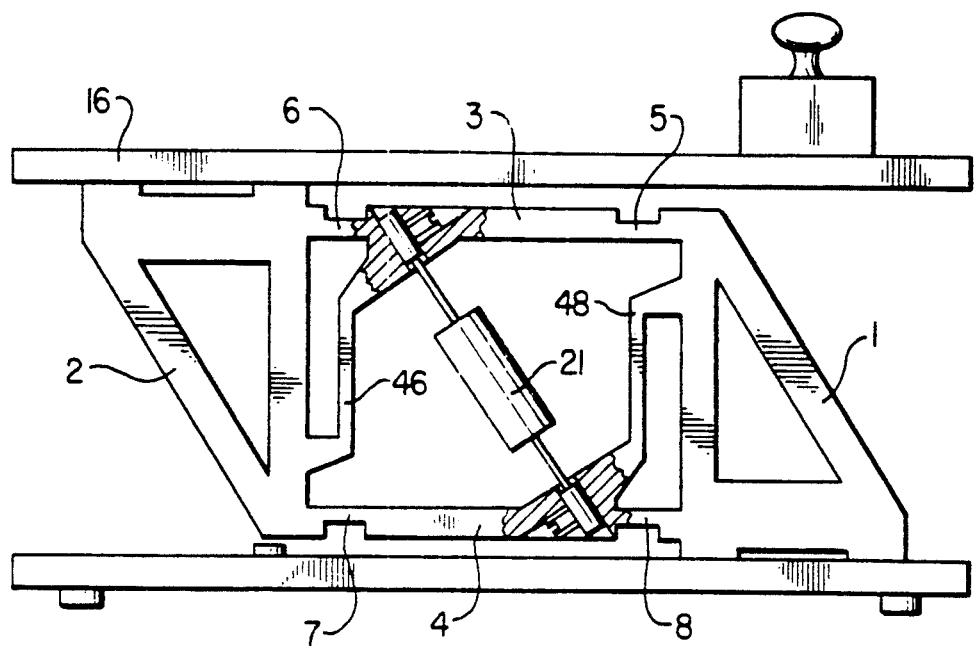
FIG. 7 is a side view of a fourth dynamometer constructed in accordance with the teachings of the present invention.

Turning next to FIG. 7, a fourth embodiment of a dynometer constructed in accordance with the teachings of the present invention may now be seen. Here, tie joints 6, 8 previously described with respect to FIG. 1 are replaced by cross joints. A first cross joint is comprised of horizontal tie joint 6 in combination with vertical tie 46. Similarly, a second cross joint is comprised of tie joint 8 in combination with vertical tie 48. In this configuration, the load-carrying element 21 is mounted between the load-carrying end of plate 3 and the frame end of plate 4. The type of mounting of the load-carrying element 21 and the type of force introduced under load conditions described with respect to FIG. 1 applies here as well. Accordingly, these details have been omitted from the description of the dynamometer illustrated in FIG. 7.

Figure 8:
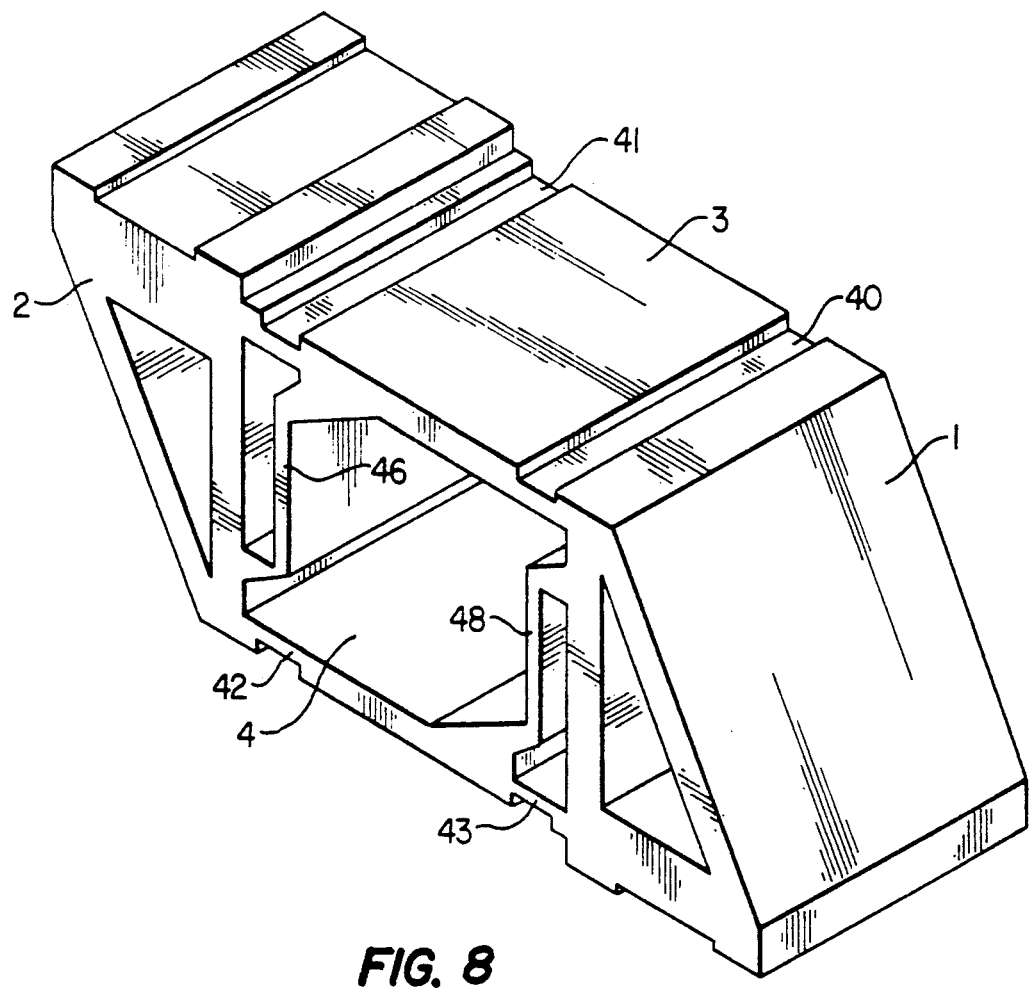
FIG. 8 is a perspective view of the parallel guide illustrated in FIG. 7.

Turning next to FIG. 8, a perspective view of the parallel guide illustrated in FIG. 7 may now be seen. Such a view is provided so that the profile from which the parallel guide is manufactured may now be seen. Compared to FIG. 6, the representation is expanded by the addition of two ties 46, 48. The profile consists of one piece and again can be manufactured from a blank either by extrusion or by wire erosion.

Thus, there has been described and illustrated herein a parallel guide dynamometer having a load-carrying element where the parallel guide is constructed from a single piece, and where the horizontal and vertical component of the force measured by the load-carrying element has a ratio in the range of 1:10 to 10:1. However, those skilled in the art will recognize that many modifications and variations besides those specifically mentioned may be made in the techniques described herein without departing substantially from the concept of the present invention. Accordingly, it should be clearly understood that the form of the invention described herein is exemplary only, and is not intended as a limitation on the scope of the present invention.

What is claimed is:

1. Dynamometer comprising an elastic force reducing parallel guide and a load-carrying element for measuring force, said parallel guide including a frame, a pair of parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

- at least one force transferring element for receiving force from said load carrier, said at least one force transferring element mounted between said load carrier and said frame along said diagonal axis, said force measured by said load-carrying element having a horizontal component and a vertical component; wherein
- the lengths of said frame, said load carrier, and said pair of parallel plates are selectively set for a select ratio of said horizontal component to said vertical component within a range of 0.1 to 10;
- said load-carrying element is acted upon directly by said load carrier and said frame;
- said parallel guide comprises a single piece of rigid material; and
- wherein said one-piece parallel guide member is a section of an extruded profile.

2. Dynamometer comprising an elastic force reducing parallel guide and a load-carrying element for measuring force, said parallel guide including a frame, a pair of parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

- at least one force transferring element for receiving force from said load carrier, said at least one force transferring element mounted between said load carrier and said frame along said diagonal axis, said force measured by said load-carrying element having a horizontal component and a vertical component; wherein
- the lengths of said frame, said load carrier, and said pair of parallel plates are selectively set for a select ratio of said horizontal component to said vertical component within a range of 0.1 to 10;
- said load-carrying element is acted upon directly by said load carrier and said frame;
- said parallel guide comprises a single piece of rigid material; and
- wherein said one-piece parallel guide member is a wire eroded blank.

3. Dynamometer comprising an elastic force reducing parallel guide and a load-carrying element for measuring force, said parallel guide including a frame, a pair of upper and lower parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

- at least one force transferring element for receiving force from said load carrier, said at least one force transferring element mounted between said load carrier and said frame along said diagonal axis, said force measured by said load-carrying element having a horizontal component and a vertical component; wherein
- the lengths of said frame, said load carrier, and said pair of parallel plates are selectively set for a select ratio of said horizontal component to said vertical component within a range of 0.1 to 10;
- said load-carrying element is acted upon directly by said load carrier and said frame;
- said parallel guide comprises a single piece of rigid material;
- a first tie joint connected to said load carrier and said upper plate.
- a first cross joint perpendicular to said first tie joint;
- a second tie joint connected to said frame and said lower plate;
- a second cross joint perpendicular to said second tie joint; and
- wherein said single piece of rigid material is a section of an extruded profile.

4. Dynamometer comprising an elastic force reducing parallel guide and a load-carrying element for measuring force, said parallel guide including a frame, a pair of upper and lower parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

- at least one force transferring element for receiving force from said load carrier, said at least one force transferring element mounted between said load carrier and said frame along said diagonal axis, said force measured by said load-carrying element having a horizontal component and a vertical component; wherein
- the lengths of said frame, said load carrier, and said pair of parallel plates are selectively set for a select ratio of said horizontal component to said vertical component within a range of 0.1 to 10;
- said load-carrying element is acted upon directly by said load carrier and said frame;
- said parallel guide comprises a single piece of rigid material;
- a first tie joint connected to said load carrier and said upper plate;
- a first cross joint perpendicular to said first tie joint;
- a second tie joint connected to said frame and said lower plate;
- a second cross joint perpendicular to said second tie joint; and
- wherein said single piece of rigid material is a wire-eroded blank.

5. Dynamometer comprising an elastic force reducing parallel guide and a load-carrying element for measuring force, said parallel guide including a frame, a pair of parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

at least one force transferring element for receiving force from said load carrier, said at least one force transferring element mounted between said load carrier and said frame along said diagonal axis, said force measured by said load-carrying element having a horizontal component and a vertical component; wherein the lengths of said frame, said load carrier, and said pair of parallel plates are selectively set for a select ratio of said horizontal component to said vertical component within a range of 0.1 to 10;

said load-carrying element is acted upon directly by said load carrier and said frame;

said parallel guide comprises a single piece of rigid material;

wherein each of said at least one force transferring elements mounted between said load carrier and said frame along said diagonal axis are arranged so that said load-carrying element is acted upon by said pressure forces; and wherein said load-carrying element is a single wire dynamometer.

6. Dynamometer comprising an elastic force reducing parallel guide and a load-carrying element for measuring force, said parallel guide including a frame, a pair of parallel plates, a plurality of tie joints, and a load carrier, said load-carrying element mounted to said load carrier and said frame along a diagonal axis as defined by said frame, said pair of parallel plates, and said load carrier, said load-carrying element preventing movement of said dynamometer, wherein said dynamometer further comprises:

at least one force transferring element for receiving force from said load carrier, said at least one force transferring element mounted between said load carrier and said frame along said diagonal axis, said force measured by said load-carrying element having a horizontal component and a vertical component; wherein the lengths of said frame, said load carrier, and said pair of parallel plates are selectively set for a select ratio of said horizontal component to said vertical component within a range of 0.1 to 10;

said load-carrying element is acted upon directly by said load carrier and said frame;

said parallel guide comprises a single piece of rigid material;

wherein said force transferring elements are mounted on said load carrier and said frame such that said load carrying element is acted on by tensile forces; and wherein said load-carrying element is a single wire dynamometer.

* * * * *

UNITED STATES PATENT AND TRADEMARK OFFICE
CERTIFICATE OF CORRECTION

PATENT NO. : 5,259,253
DATED : November 9, 1993
INVENTOR(S) : Johannes Wirth and Mario Gallo It is certified that error appears in the above-indentified patent and that said Letters Patent is hereby corrected as shown below:

Column 6, line 5: Delete "frame"; insert "force"

Signed and Sealed this

Twenty-fourth Day of May, 1994

Attest:

BRUCE LEHMAN

Attesting Officer     Commissioner of Patents and Trademarks